United States Patent
Koga et al.

(10) Patent No.: US 11,523,246 B2
(45) Date of Patent: Dec. 6, 2022

(54) INFORMATION PROCESSING APPARATUS AND INFORMATION PROCESSING METHOD

(71) Applicant: SONY CORPORATION, Tokyo (JP)

(72) Inventors: Yasuyuki Koga, Tokyo (JP); Kei Nitta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,333

(22) PCT Filed: Jul. 1, 2019

(86) PCT No.: PCT/JP2019/026038
§ 371 (c)(1),
(2) Date: Jan. 6, 2021

(87) PCT Pub. No.: WO2020/012997
PCT Pub. Date: Jan. 16, 2020

(65) Prior Publication Data
US 2021/0281966 A1    Sep. 9, 2021

(30) Foreign Application Priority Data

Jul. 13, 2018    (JP) .............................. JP2018-133742

(51) Int. Cl.
*H04S 7/00*    (2006.01)
*G02B 27/00*    (2006.01)
(Continued)

(52) U.S. Cl.
CPC .......... *H04S 7/304* (2013.01); *G02B 27/0093* (2013.01); *H04S 7/40* (2013.01);
(Continued)

(58) Field of Classification Search
None
See application file for complete search history.

(56) References Cited

U.S. PATENT DOCUMENTS

2011/0136571 A1   6/2011   Ito
2014/0375683 A1*  12/2014  Salter ................. G02B 27/0172
                                                         345/633
2015/0352437 A1   12/2015  Koseki et al.

FOREIGN PATENT DOCUMENTS

JP    2010-056589 A    3/2010
JP    2011-120645 A    6/2011
(Continued)

OTHER PUBLICATIONS

International Search Report and Written Opinion of PCT Application No. PCT/JP2019/026038, dated Sep. 24, 2019, 08 pages of ISRWO.

*Primary Examiner* — Qin Zhu
(74) *Attorney, Agent, or Firm* — Chip Law Group

(57) ABSTRACT

Provided is an information processing apparatus that includes a determination unit and a display control unit. The determination unit obtains a position of a virtual object relative to a display region and determines whether or not a correction allowable region set in a region different from the virtual object overlaps at least a part of the display region when the virtual object is located outside the display region. The display control unit causes at least a part of a display object showing the virtual object in the display region to be displayed in a case where the determination unit determines that the correction allowable region overlaps at least the part of the display region.

12 Claims, 13 Drawing Sheets

(51) Int. Cl.
  *G06F 3/01*     (2006.01)
  *G06F 3/04815*  (2022.01)
  *G06F 3/04842*  (2022.01)
  *G06F 3/16*     (2006.01)

(52) U.S. Cl.
  CPC ....... *H04S 2400/01* (2013.01); *H04S 2400/11* (2013.01); *H04S 2420/01* (2013.01)

(56)              References Cited

FOREIGN PATENT DOCUMENTS

JP        2015-232783 A    12/2015
JP        2017-005387 A     1/2017

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/026038 filed on Jul. 1, 2019, which claims priority benefit of Japanese Patent Application No. JP 2018-133742 filed in the Japan Patent Office on Jul. 13, 2018. Each of the above-referenced applications is hereby incorporated herein by reference in its entirety.

TECHNICAL FIELD

The present technology relates to an information processing apparatus, a program, and an information processing method which are associated with virtual object presentation.

BACKGROUND ART

Stereo sound is used in the fields of augmented reality (AR) and virtual reality (VR). The stereo sound makes it possible for a user to perceive that a virtual sound source exists at the position of a virtual object.

For example, Patent Literature 1 has is disclosed a technology of determining a head motion of a user by using a gyro sensor and an acceleration sensor mounted on a head-mounted display and localizing a virtual sound source in accordance with the determination result.

CITATION LIST

Patent Literature

Patent Literature 1: Japanese Patent Application Laid-open No. 2010-056589

DISCLOSURE OF INVENTION

Technical Problem

However, since the resolution of spatial perception in human hearing is low, the user may know a rough direction of the virtual sound source but may not know the correct direction in a case where the virtual sound source is localized at a virtual object located outside a display angle of view in the AR device or the VR device.

In this case, the user cannot view the virtual object because the user cannot direct the gaze to the virtual object and the display angle of view does not include the virtual object. Therefore, a problem in that gaze guidance to the virtual object is not achieved arises.

In view of the above-mentioned circumstances, it is an object of the present technology to provide an information processing apparatus, a program, and an information processing method, by which a user's gaze can be quickly guided to a virtual object.

Solution to Problem

In order to accomplish the above-mentioned object, an information processing apparatus according to the present technology includes a determination unit and a display control unit.

The determination unit obtains a position of a virtual object relative to a display region and determines whether or not a correction allowable region set in a region different from the virtual object overlaps at least a part of the display region when the virtual object is located outside the display region.

The display control unit causes at least a part of a display object showing the virtual object in the display region to be displayed in a case where the determination unit determines that the correction allowable region overlaps at least the part of the display region.

With this configuration, when the user moves a display device and the display area overlaps the correction allowable region, the display object showing the virtual object is displayed in the display area. This allows the user to quickly view the virtual object because the display object is displayed before the user correctly sets the display area on the virtual object.

The display control unit may cause the virtual object to move to a contact position that is a position at which the correction allowable region is in contact with the display region, and set at least a part of the virtual object as the display object.

The information processing apparatus may further include an acoustic processing unit that localizes a virtual sound source at the virtual object, in which the acoustic processing unit may move, when the display control unit causes the virtual object to move to the contact position, the virtual sound source in accordance with the movement of the virtual object.

The display control unit may set a copy image of the virtual object as the display object and causes the copy image to be displayed at a position in the display region, the position being closest to the virtual object.

The display control unit may cause the copy image to move to be superimposed on the virtual object when the virtual object moves into the display region.

The display control unit may generate an enlarged image of the virtual object, which is centered at the virtual object, and set a portion of the enlarged image, which is included in the display region, as the display object.

The display control unit may cause the enlarged image to contract toward the virtual object when the virtual object moves into the display region.

The display control unit may generate an icon indicating a direction of the virtual object as the display object.

The information processing apparatus may further include an acoustic processing unit that localizes a virtual sound source at the virtual object, in which the determination unit may determine whether or not the correction allowable region and the display region overlap each other when the virtual object is not located within the display region after a predetermined period of time elapses after sound is generated from the virtual sound source.

The information processing apparatus may further include an acoustic processing unit that localizes a virtual sound source at the virtual object, in which the determination unit may determine whether or not the correction allowable region and the display region overlap each other when moving velocity of the display region relative to the virtual object is equal to or lower than a predetermined value after sound is generated from the virtual sound source.

In order to accomplish the above-mentioned object, a program according to the present technology causes an information processing apparatus as a determination unit and a display control unit.

The determination unit obtains a position of a virtual object relative to a display region of a display device and determines whether or not a correction allowable region set in a region different from the virtual object overlaps at least a part of the display region when the virtual object is located outside the display region.

The display control unit causes at least a part of a display object showing the virtual object in the display region to be displayed in a case where the determination unit determines that the correction allowable region overlaps at least the part of the display region.

In order to accomplish the above-mentioned object, an information processing method according to the present technology includes obtaining, by a determination unit, a position of a virtual object relative to a display region of a display device and determines whether or not a correction allowable region set in a region different from the virtual object overlaps at least a part of the display region when the virtual object is located outside the display region.

The display control unit causes at least a part of a display object showing the virtual object in the display region to be displayed in a case where the determination unit determines that the correction allowable region overlaps at least the part of the display region.

Advantageous Effects of Invention

As described above, in accordance with the present technology, it is possible to provide an information processing apparatus, a program, and an information processing method, by which a user's gaze can be quickly guided to a virtual object. It should be noted that the effects described here are not necessarily limitative and any effect described in the present disclosure may be provided.

MODE(S) FOR CARRYING OUT THE INVENTION

An information processing apparatus according to this embodiment will be described.

[Configuration of Information Processing Apparatus]

Figure 1:
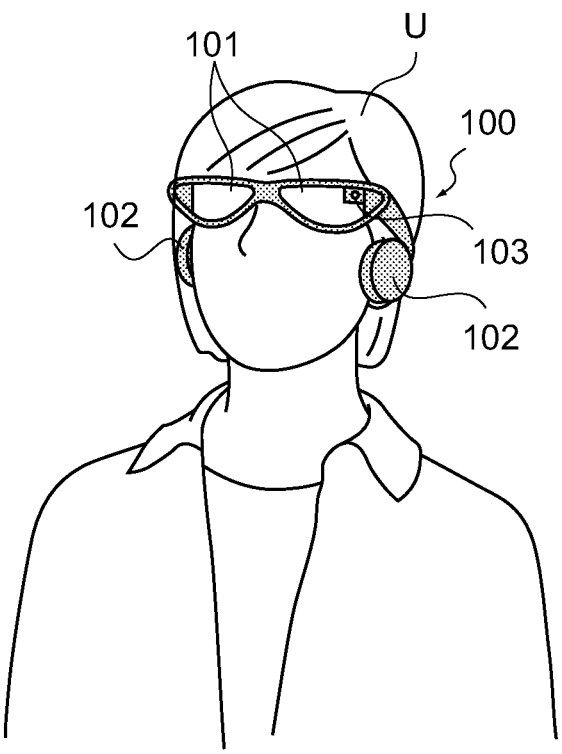
FIG. 1 A schematic diagram of an information processing apparatus according to an embodiment of the present technology.

FIG. 1 is a schematic diagram of an information processing apparatus 100 according to this embodiment. As shown in the figure, the information processing apparatus 100 can be a head-mounted display (HMD) that can be mounted on the head of a user U. Further, the information processing apparatus 100 is not limited to the HMD, and may be an electronic apparatus including a display such as a smartphone.

The information processing apparatus 100 includes displays 101, speakers 102, and a sensor 103.

The displays 101 are display devices disposed in front of the user's eyes, and may be transmissive displays or non-transmissive displays.

The speakers 102 are attached directly to the user's ears or in the vicinity of the ears, and output sound. The speakers 102 may be headphones or the like connected to the information processing apparatus 100.

The sensor 103 detects a direction of the information processing apparatus 100. The sensor 103 is a gyro sensor, an acceleration sensor, or the like, and only needs to be capable of detecting the direction of the information processing apparatus 100. Further, the sensor 103 may be an image sensor for capturing an image based on which the direction of the information processing apparatus 100 can be calculated.

Figure 2:
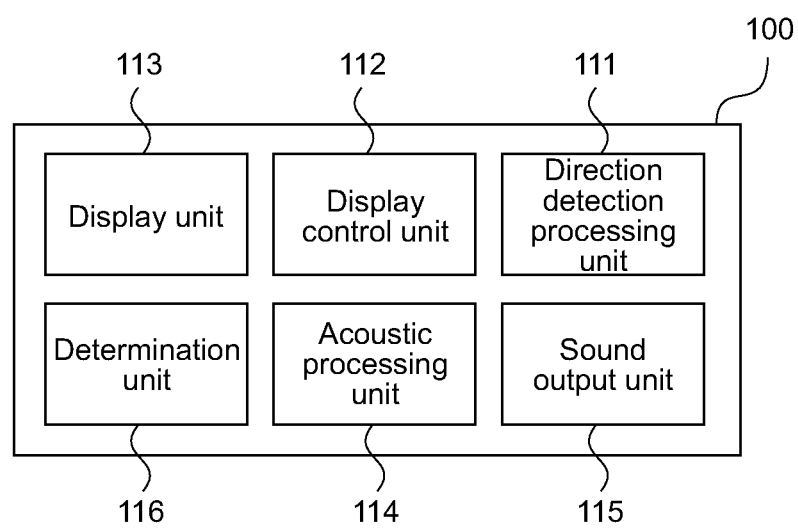
FIG. 2 A block diagram showing functional configurations of the information processing apparatus.

FIG. 2 is a block diagram showing functional configurations of the information processing apparatus 100.

As shown in the figure, the information processing apparatus 100 includes a direction detection processing unit 111, a display control unit 112, a display unit 113, an acoustic processing unit 114, a sound output unit 115, and a determination unit 116.

The direction detection processing unit 111 is connected to the sensor 103 and detects the direction of the information processing apparatus 100 on the basis of the output of the sensor 103. The direction detection processing unit 111 supplies the detected direction of the information processing apparatus 100 to the display control unit 112, the acoustic processing unit 114, and the determination unit 116.

The display control unit 112 generates an image to be displayed (hereinafter, display image) on the displays 101.

The display control unit 112 arranges a virtual object on the basis of the direction of the information processing apparatus 100 detected by the direction detection processing unit 111.

Figure 3:
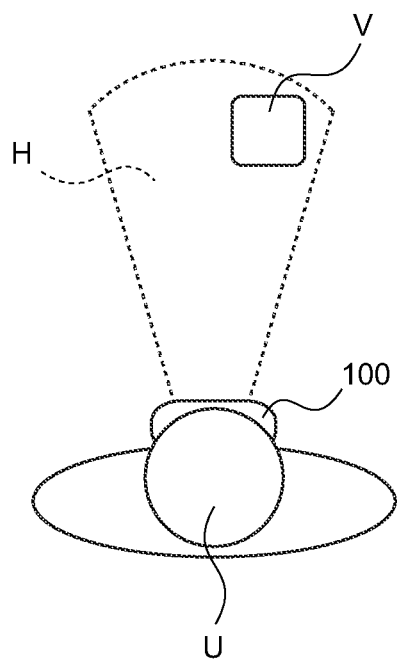
FIG. 3 A schematic diagram of a virtual object disposed by a display control unit provided in the information processing apparatus.

FIG. 3 is a schematic diagram showing the user U wearing the information processing apparatus 100 and a visual field range H, which is a range that the user U views through the displays 101. The display control unit 112 arranges a virtual object V at a predetermined position with respect to the information processing apparatus 100 as shown in the figure. The shape and number of the virtual object V are not particularly limited. The display control unit 112 supplies the generated display image to the display unit 113 and supplies the position of the virtual object V to the determination unit 116.

Figure 4:
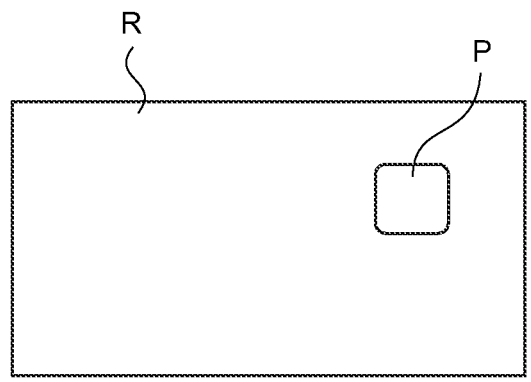
FIG. 4 A schematic diagram of a display object displayed by a display unit provided in the information processing apparatus.

The display unit 113 supplies the display image generated by the display control unit 112 to the displays 101 for displaying it. FIG. 4 is a schematic diagram showing a display image displayed in a display region R of the displays 101. As shown in FIG. 4, the display control unit 112 generates a display image including a display object P and the display unit 113 displays this display image in the display region R.

When the user U views the display object P displayed in the display region R, the user U can recognize that the virtual object V exists at the predetermined position as shown in FIG. 3.

On the other hand, when the virtual object is outside the visual field range H of the user U, the display object P is not displayed in the display area R and the user U cannot view the virtual object V.

The acoustic processing unit 114 performs acoustic processing such that the virtual sound source exists at the predetermined position and supplies the result of processing to the sound output unit 115. The acoustic processing unit 114 is capable of localizing the virtual sound source by using a head-related transfer function (HRTF).

The sound output unit 115 supplies an audio signal supplied from the acoustic processing unit 114 to the speakers 102 and causes the speakers 102 to generate sound.

Figure 5:
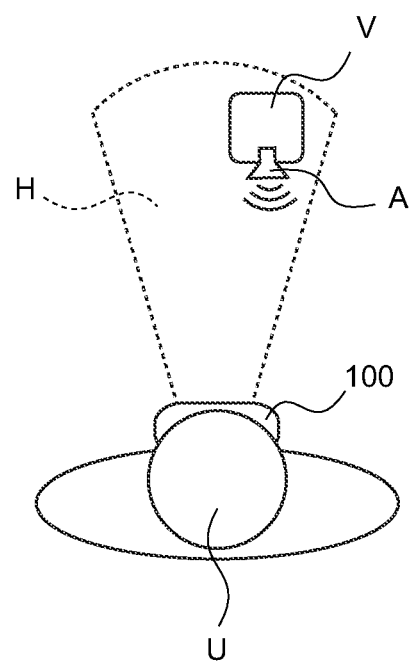
FIG. 5 A schematic diagram of a virtual sound source which is localized at a virtual object by an acoustic processing unit provided in the information processing apparatus.
Figure 6:
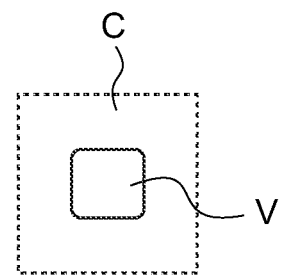
FIG. 6 A schematic diagram of a correction allowable region set by a determination unit provided in the information processing apparatus.

FIG. 5 is a schematic diagram showing virtual sound source localization by the acoustic processing unit 114. As shown in the figure, the acoustic processing unit 114 is capable of localizing a virtual sound source A at the position of the virtual object V. In this case, the user can perceive the virtual object V as if it were a sound source.

The determination unit 116 sets a correction allowable region (collider) in a region different from the virtual object V. The region different from the virtual object V may be, for example, a region around the virtual object V or a region separated from the virtual object V. FIG. 5 is a schematic diagram showing a correction allowable region C set around the virtual object V.

The correction allowable region C is a three-dimensional region set in the region different from the virtual object V and can be a cubic range surrounding the virtual object V. Further, the correction allowable region C may be a spherical range surrounding the virtual object V or may have another shape. The size of the correction allowable region C relative to the virtual object V is not particularly limited.

The determination unit 116 performs contact determination processing on the basis of the direction of the information processing apparatus 100 supplied from the direction detection processing unit 111 and the position of the virtual object V supplied from the display control unit 112, and supplies the processing results to the display control unit 112 and the acoustic processing unit 114. Details of the contact determination processing will be described later.

The information processing apparatus 100 has the configuration as described above. The above-mentioned functional configurations of the information processing apparatus 100 may be all installed in the HMD or only some of them may be installed in the HMD and the other configurations may be installed in another information processing apparatus connected to the HMD, such as a smartphone and a server.

For example, a configuration in which the direction detection processing unit 111, the display unit 113, and the sound output unit 115 are installed in the HMD and the display control unit 112, the acoustic processing unit 114, and the determination unit 116 are installed in the server or the like is also possible. In this case, the display control unit 112, the acoustic processing unit 114, and the determination unit 116 communicate with the direction detection processing unit 111, the display unit 113, and the sound output unit 115 via a communication unit, such that the above-mentioned functional configurations can be realized.

[Operation of Information Processing Apparatus]

Figure 7A:
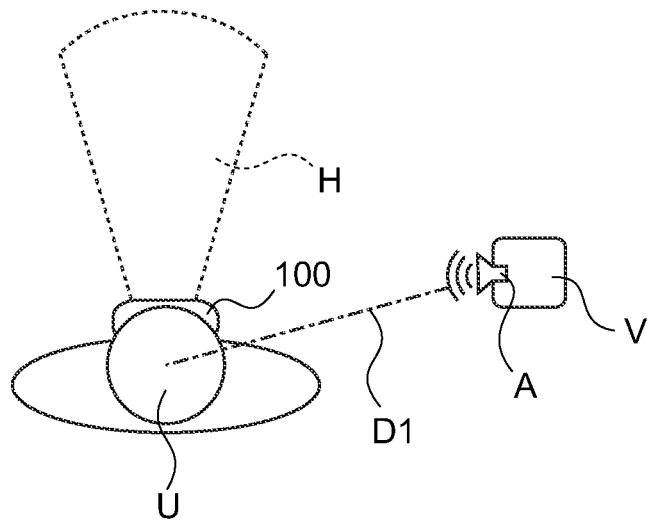
FIGS. 7A and 7B Schematic diagrams of gaze guidance to a virtual object by the information processing apparatus.
Figure 7B:
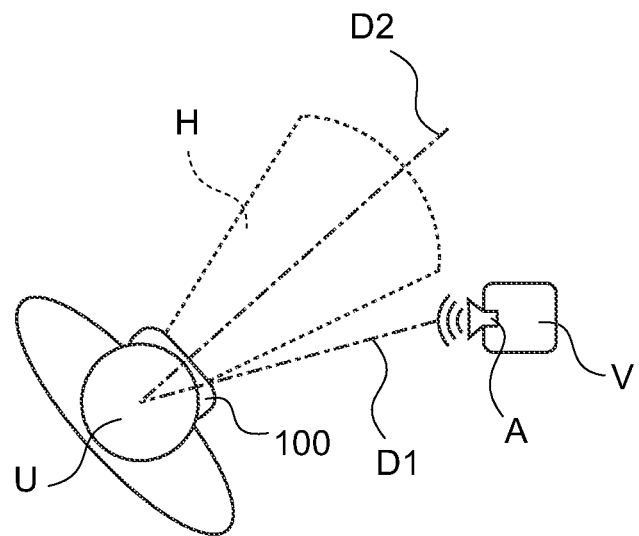

Next, an operation of the information processing apparatus 100 will be described. FIGS. 7A and 7B are schematic diagrams showing the operation of the information processing apparatus 100.

As shown in FIG. 7A, when the visual field range H of the user U is guided to the virtual object V in a state in which the visual field range H of the user U is oriented in a direction different from a direction D1 in which the virtual object V exists, the information processing apparatus 100 localizes the virtual sound source A at the virtual object V.

When the user U accurately recognizes the direction D1 in which the virtual sound source A exists and moves the visual field range H in the direction D1, the display object P is displayed in the display area R (see FIG. 3) and the user U can view the virtual object V.

However, the resolution of spatial perception in human hearing has a limitation and the direction of the virtual sound source A may not be accurately recognized.

FIG. 7B is a schematic diagram showing a state in which the direction D1 of the virtual sound source A generated by the information processing apparatus 100 is different from a direction D2 of the virtual sound source A recognized by the user U. As shown in the figure, the user U moves the visual field range H in the direction D2 in which the user U recognizes that the virtual sound source A exists, and in reality, the user U moves the visual field range H in a direction in which the virtual sound source A does not exist.

In this case, the display object P is not displayed in the display area R, and the user U cannot view the virtual object V. Therefore, the user U needs to search for the virtual object V, and gaze guidance is not achieved.

Especially in recent years, the accuracy of virtual sound source localization has been improved, and it has become possible to correctly localize the virtual sound source even at a small virtual object. Therefore, if the visual field range is not exactly set on the virtual object V, the virtual object V is often not visible.

Further, other reasons why the user U cannot accurately recognize the direction of the virtual sound source A can be a difference in the head-related transfer function due to an offset of the speakers 102 or the like, an error in the virtual sound source localization due to the use of a general-purpose head-related transfer function, and the like.

As described above, the information processing apparatus 100 deals with a case where the actual direction of the virtual sound source A differs from the direction of the virtual sound source A recognized by the user U as follows.

[Regarding Contact Determination Processing]

When the virtual object V does not fall within the visual field range H, the determination unit 116 performs contact determination processing.

The determination unit 116 may perform contact determination processing at the time when the sound is generated from the virtual sound source A or may perform contact determination processing when the virtual object V does not fall within the visual field range H even after a predetermined period of time elapses after the sound is generated.

Figure 8A:
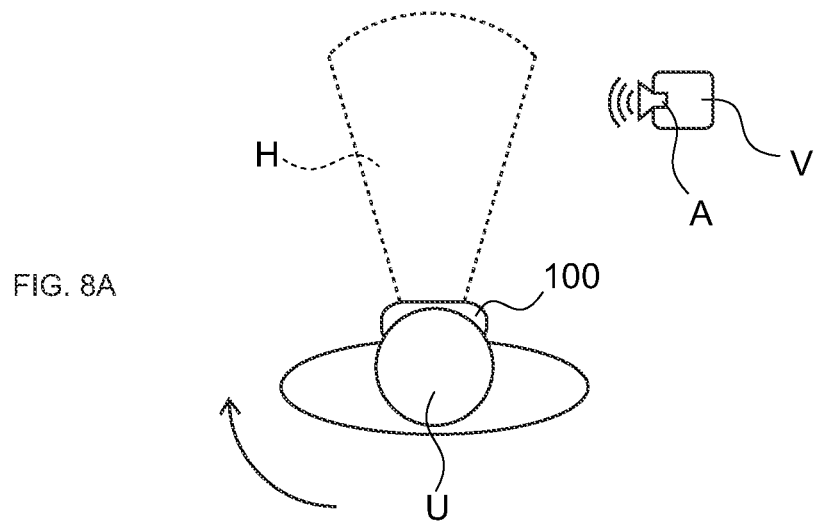
FIGS. 8A and 8B Schematic diagrams of a contact determination processing by the determination unit provided by the information processing apparatus.

FIGS. 8A, 8B, 9A, 9B, 10A, and 10A are schematic diagrams showing the contact determination processing. As shown in FIG. 8A, when the information processing apparatus 100 localizes the virtual sound source A at the virtual object V, the user U moves the visual field range H in the direction of the virtual sound source A in response to the sound (arrow in the figure).

Figure 8B:
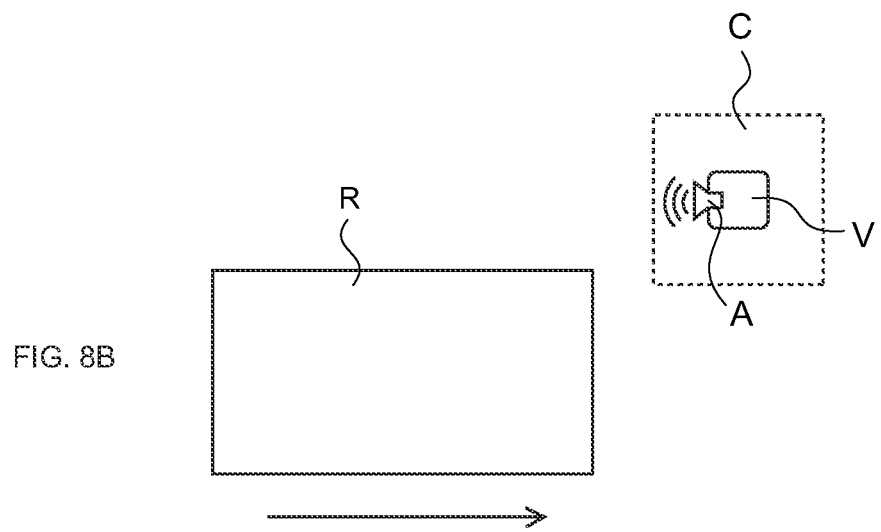

FIG. 8B is a schematic diagram showing a virtual positional relationship between the display region R and the virtual object V on the same plane as the display region R at this time. The display region R moves toward the virtual object V as the visual field range H moves (arrow in the figure).

The determination unit 116 determines whether or not the correction allowable region C and the display region R overlap each other. The determination unit 116 is capable of determining a two-dimensional size of the correction allowable region C on the same plane as the display area R and determining whether the display area R and the correction allowable region C at least partially overlap each other.

Figure 9A:
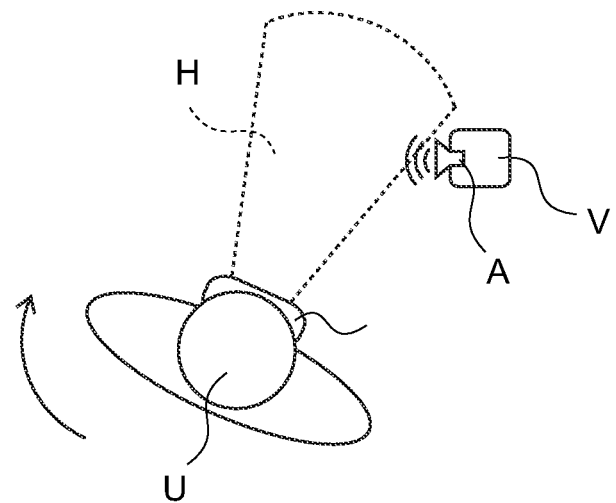
FIGS. 9A and 9B Schematic diagrams of the contact determination processing by the determination unit provided by the information processing apparatus.
Figure 9B:
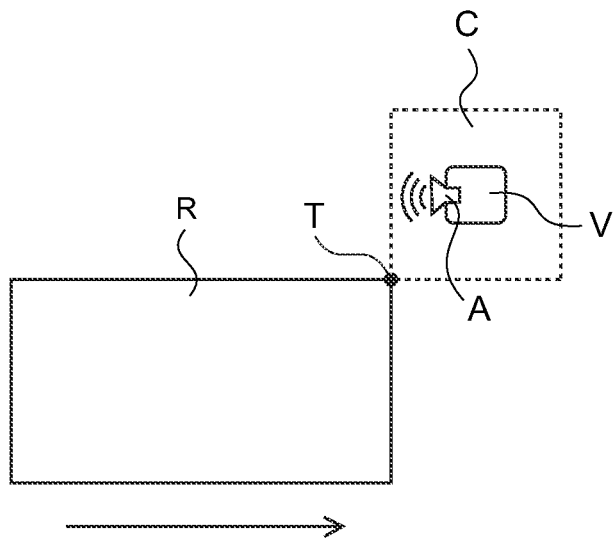

FIGS. 9A and 9B each show a state in which the user U further moves the visual field range H and the display area R is in contact with the correction allowable region C and FIG. 9[[(b)]]B shows a contact position T that is a contact position at which the display area R is in contact with the correction allowable region C. When the display area R comes in contact with the correction allowable region C as shown in FIG. 9B, the determination unit 116 notifies the display control unit 112 of the coordinates of the contact position T.

Figure 10A:
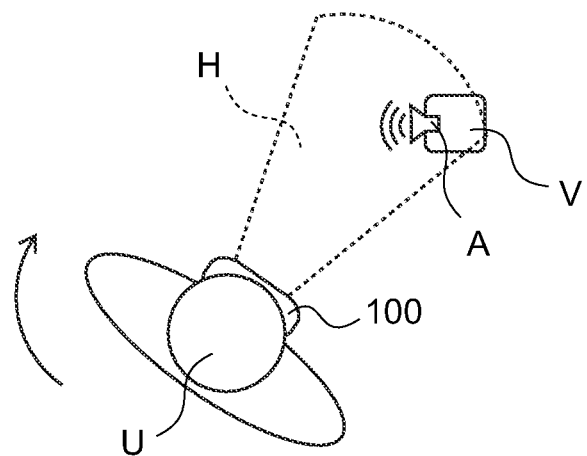
FIGS. 10A and 10B Schematic diagrams showing a movement of the virtual object by the display control unit provided in the information processing apparatus.
Figure 10B:
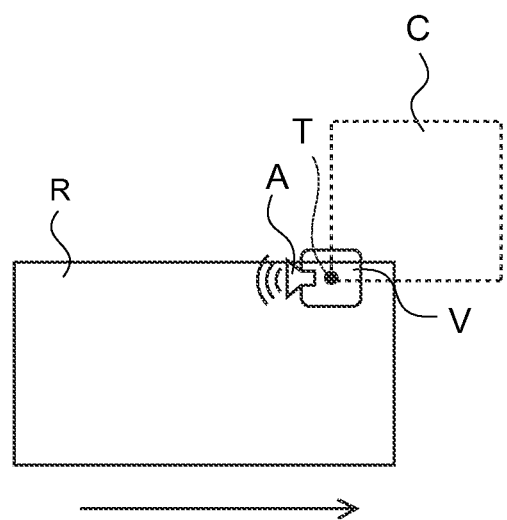

When the display control unit 112 is notified of the coordinates of the contact position T by the determination unit 116, the display control unit 112 moves the virtual object V to the coordinates of the contact position T. FIGS. 10A and 10B each show a state in which the virtual object V is moved to the coordinates of the contact position T. It should be noted that the contact position T has moved from the position shown in FIG. 9B in the display area R by the movement of the visual field range H.

Further, as shown in FIGS. 10A and 10B, the acoustic processing unit 114 moves the virtual sound source A in accordance with the virtual object V moved.

Figure 11:
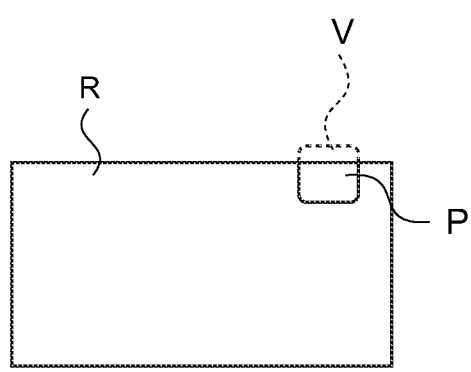
FIG. 11 A schematic diagram of a display object generated by the display control unit provided in the information processing apparatus.

FIG. 11 is a schematic diagram showing the display object P displayed in the display area R at this time. As shown in the figure, a portion (solid line portion in the figure) of the virtual object V moved by the display control unit 112, which overlaps the display region R, is displayed as the display object P in the display region R. It should be noted that the display control unit 112 may further move the virtual object V to the display area R and display the entire virtual object V as the display object P in the display area R. Further, the display control unit 112 may cause only a part of the display object P to be displayed in the display area R.

Thus, the user U can view the virtual object V, i.e., the gaze guidance to the virtual object V is achieved.

It should be noted that when the acoustic processing unit 114 moves the virtual sound source A while the user U is moving the visual field range H, the acoustic processing unit 114 can reduce discomfort to the user U. Further, the acoustic processing unit 114 may reduce discomfort by reducing the moving velocity of the virtual sound source A when the visual field range H is not moved.

Figure 12A:
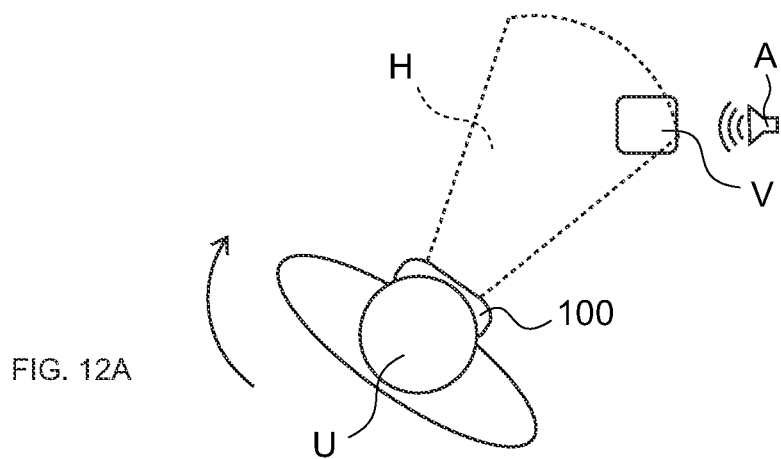
FIGS. 12A and 12B Schematic diagrams showing a movement of the virtual object by the display control unit provided in the information processing apparatus.
Figure 12B:
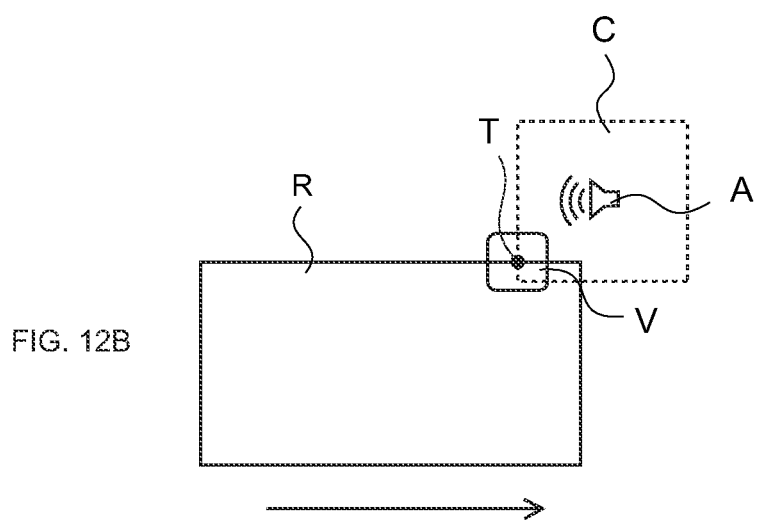

Further, the acoustic processing unit 114 does not move the virtual sound source A together with the virtual object V. FIGS. 12A and 12B are schematic diagrams each showing a case where only the virtual object V moves. When the display area R comes into contact with the correction allowable region C as shown in the figure, the display control unit 112 may move the virtual object V and the acoustic processing unit 114 may maintain the position of the virtual sound source A.

Further, when the original coordinates of the virtual object V fall within the visual field range H after the display control unit 112 moves coordinates of the virtual object V, the display control unit 112 may return the virtual object V to the original coordinates. In this case, the acoustic processing unit 114 may also return the virtual sound source A to the original coordinates of the virtual object V.

Figure 13:
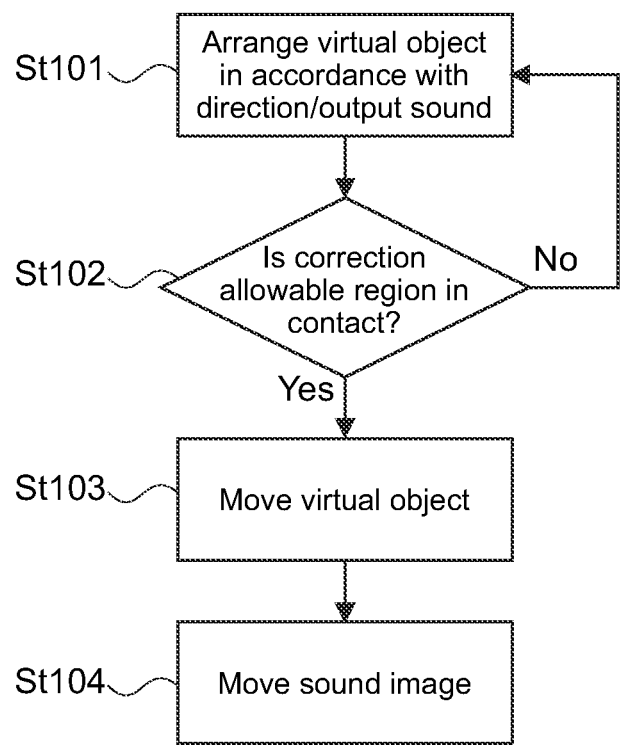
FIG. 13 A flowchart showing an operation of the information processing apparatus.

FIG. 13 is a flowchart showing an operation of the information processing apparatus 100. As shown in the figure, the information processing apparatus 100 arranges the virtual object V at predetermined coordinates in accordance with the direction of the information processing apparatus 100 and localizes the virtual sound source A at the virtual object V and outputs sound (St101).

Next, the determination unit 116 performs contact determination processing (St102). When the correction allowable region C is not in contact with the display area R (No in St102), the information processing apparatus 100 keeps the virtual object V arranged at the predetermined coordinates and causes the virtual sound source A to output sound (St101).

When the correction allowable region C comes into contact with the display region R (Yes in St102), the display control unit 112 moves the virtual object V to contact coordinates at which the display region R is in contact with the correction allowable region C (St103). Thus, the display object P is displayed in the display area R. Further, the acoustic processing unit 114 moves the virtual sound source A to the coordinates of the moved virtual object V (St104).

Thereafter, the display control unit 112 causes the display object P to be displayed in the display area R in accordance with the moved virtual object V and the direction of the information processing apparatus 100. It should be noted that the acoustic processing unit 114 may maintain the virtual sound source A at the original position of the virtual object V as described above, and St104 does not necessarily need to be performed.

[Regarding Mode of Contact Determination Processing]

As described above, the determination unit 116 sets the correction allowable region C in a region different from the virtual object V. In a case where a plurality of virtual objects V exists, the correction allowable region C can be set for all the virtual objects V.

Further, the determination unit 116 may set the correction allowable region C only to some of the virtual objects V, for example, the virtual object V having low visibility or the virtual object V which the user is particularly recommended to view. The virtual object V having low visibility is a virtual object that is small in size, has low luminance, or has high transparency, for example.

Further, the determination unit 116 may set the size of the correction allowable region C in accordance with the visibility of the virtual object V. For example, when the virtual object V is small in size, the correction allowable region C can be increased in size, and when the virtual object V is large in size, the correction allowable region C can be decreased in size.

Further, the determination unit 116 may perform the contact determination processing only when the user cannot immediately find the virtual object V. For example, the determination unit 116 can perform the contact determination processing only when the virtual object V does not fall within the visual field range H after a predetermined period of time elapses after the sound is generated from the virtual sound source A.

Alternatively, the determination unit 116 may perform the contact determination processing only when the moving velocity of the display region R is equal to or lower than a predetermined value, i.e., when the user U cannot quickly set the visual field range H on the virtual object V after the sound is generated from the virtual sound source A.

This allows the user U to accurately recognize the position of the virtual object V at which the virtual sound source A is localized, and the contact determination processing, that is, the movement of the coordinates of the virtual object V, can be prevented even when the user U is moving the visual field range H.

Further, the determination unit 116 may perform the contact determination processing in accordance with the type of the virtual sound source A. For example, the determination unit 116 may be prevented from performing the contact determination processing when the virtual sound source A and the virtual object V have common images (e.g., when the virtual object V is a bottle and the virtual sound source A is a water sound) and the determination unit 116 may perform the contact determination processing only when the virtual sound source A and the virtual object V have different images.

Further, the determination unit 116 may perform the contact determination processing in accordance with the position of the virtual sound source A. For example, when the virtual sound source A is positioned on a midline plane of a person (plane at the same distance from the right and left ears), it becomes difficult to perceive the position of the virtual sound source A. Therefore, the determination unit 116 may perform the contact determination processing only when the virtual object V at which the virtual sound source A is localized is located on the midline plane or near the midline plane.

Further, the determination unit 116 may perform the contact determination processing in accordance with the frequency of the sound forming the virtual sound source A. Since the directivity of a low-pitched sound is generally lower than the directivity of a high-pitched sound, it is difficult to recognize the direction of the virtual sound source A when the sound forming the virtual sound source A is a low-pitched sound. Therefore, the determination unit 116 may perform the contact determination processing only when the frequency of the sound generating the virtual sound source A is lower than a predetermined value.

[Regarding Display Object]

As described above, the display control unit 112 is capable of moving the virtual object V to the coordinates at which the display region R is in contact with the correction allowable region C in the contact determination processing, and displaying the display object P in the display region R (see FIG. 11).

Here, the display control unit 112 may generate a display object indicating the position of the virtual object V without moving the virtual object V when the display region R comes in contact with the correction allowable region C.

FIGS. 14A, 14B, 15A, 15B, and 16 are schematic diagrams showing various display objects generated by the display control unit 112.

Figure 14A:
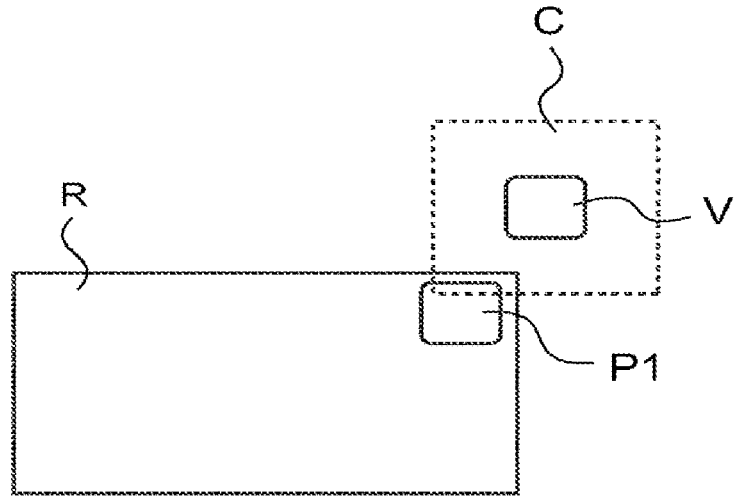
FIGS. 14A and 14B Schematic diagrams of a display object (copy image) generated by the display control unit provided in the information processing apparatus.
Figure 14B:
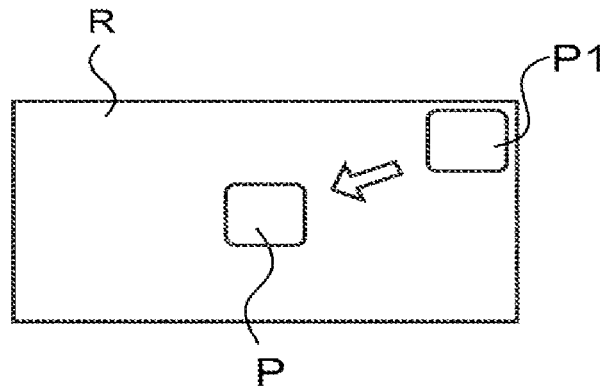

When the display region R comes in contact with the correction allowable region C as shown in FIG. 14A, the display control unit 112 may cause a copy image P1, which is an image obtained by copying the virtual object V, to be displayed as a display object without moving the virtual object V.

The copy image P1 is, for example, an image obtained by making the virtual object V semi-transparent or blurred and is an image which enables the user to recognize that it is not the virtual object V itself. The position of the copy image P1 is favorably a position in the display region R, the position being closest to the virtual object V.

The user can recognize that the virtual object V exists in the direction of the copy image P1 by viewing the copy image P1.

Further, when the user refers to the copy image P1 and sets the visual field range H on the virtual object V, the display control unit 112 is capable of moving the copy image P1 such that the copy image P1 is superimposed on the display object P which is the image of the virtual object V itself (arrow in the figure). This allows the user to recognize the virtual object V, which is the copy image P1 itself.

Figure 15A:
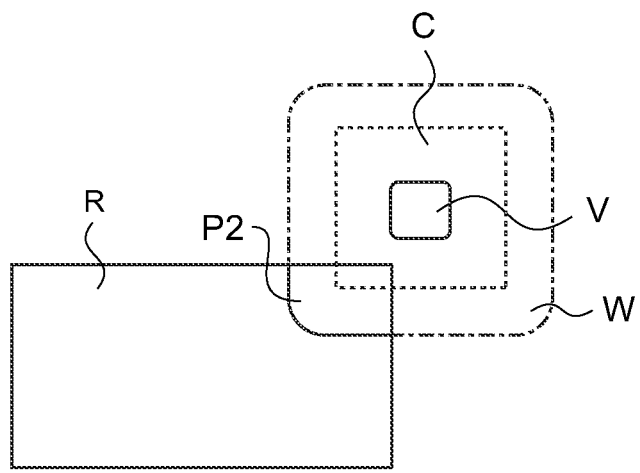
FIGS. 15A and 15B Schematic diagrams of a display object (enlarged image) generated by the display control unit provided in the information processing apparatus.
Figure 15B:
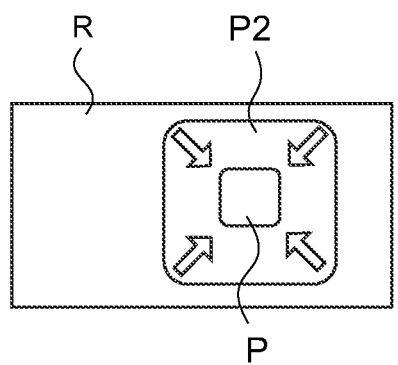

Further, when the display region R comes in contact with the correction allowable region C as shown in FIG. 15A, the display control unit 112 may arrange an enlarged image W, which is an image obtained by enlarging the virtual object V, around the virtual object V without moving the virtual object V. An enlarged image P2, which is a portion of the enlarged image W, which is included in the display region R, is displayed on the display region R as a display object.

The enlarged image P2 is, for example, an image obtained by making the virtual object V semi-transparent or blurred and is an image which enables the user to recognize that it is not the virtual object V itself. The user can recognize that the virtual object V exists in the direction of the center of the enlarged image P2 by viewing the enlarged image P2.

Further, when the user refers to the enlarged image P2 and sets the visual field range H on the virtual object V, the display control unit 112 is capable of deforming the enlarged image P2 by contracting the enlarged image P2 to the display object P, which is the image of the virtual object V itself (arrow in the figure). This allows the user to recognize the virtual object V, which is the enlarged image P2 itself.

Figure 16:
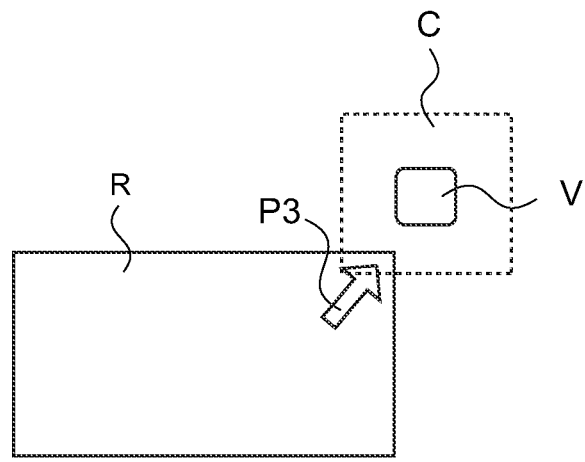
FIG. 16 A schematic diagram of a display object (suggestion figure) generated by the display control unit provided in the information processing apparatus.

Further, when the display region R comes in contact with the correction allowable region C as shown in FIG. 16, the display control unit 112 may cause an icon indicating the direction of the virtual object V to be displayed as a display object P3 without moving the virtual object V. The display object P3 may have an arrow shape as shown in FIG. 16, for example. Further, the display object P3 may have another shape indicating the virtual object V.

The user can recognize that the virtual object V exists in the direction indicated by the display object P3 by viewing the display object P3.

[Regarding Hardware Configurations]

The functional configurations of the information processing apparatus 100 described above can be realized by cooperation of hardware and programs.

Figure 17:
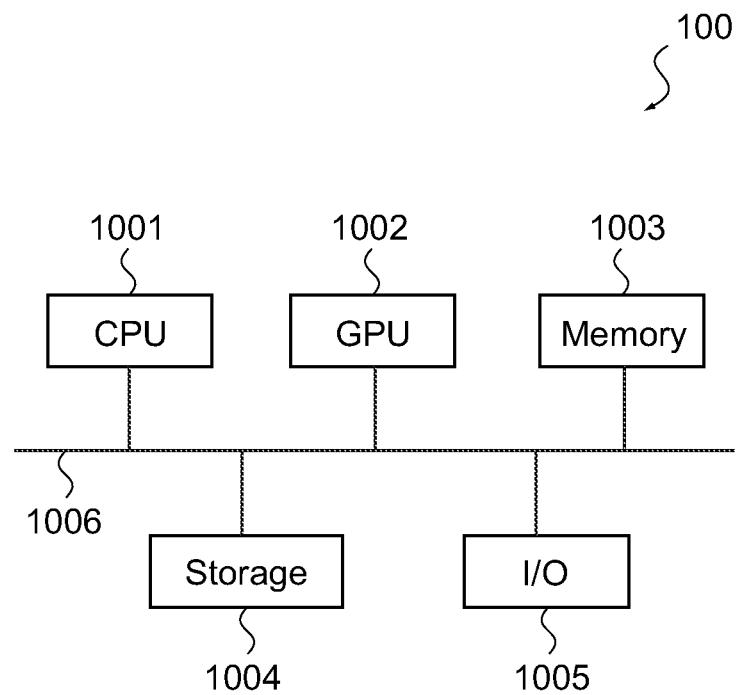
FIG. 17 A block diagram showing hardware configurations of the information processing apparatus.

FIG. 17 is a schematic diagram showing hardware configurations of the information processing apparatus 100. As shown in FIG. 16, the information processing apparatus 100 includes a CPU 1001, a GPU 1002, a memory 1003, a storage 1004, and an input/output unit (I/O) 1005 as hardware configurations. Those are connected to each other by a bus 1006.

The central processing unit (CPU) 1001 controls the other configurations in accordance with programs stored in the memory 1003, performs data processing in accordance with the programs, and stores processing results in the memory 1003. The CPU 1001 can be a microprocessor.

The graphic processing unit (GPU) 1002 performs image processing under the control of CPU 1001. The GPU 1002 may be a microprocessor.

The memory 1003 stores programs and data to be executed by the CPU 1001. The memory 1003 can be a random access memory (RAM).

The storage 1004 stores programs and data. The storage 1004 can be a hard disk drive (HDD) or a solid state drive (SSD).

The input/output unit 1005 receives an input to the information processing apparatus 100 and supplies an output of the information processing apparatus 100 to an external device. The input/output unit 1005 includes an input device such as a touch panel and a keyboard, an output device such as a display, and a connection interface such as a network.

The hardware configurations of the information processing apparatus 100 are not limited to those shown here, and only need to realize the functional configurations of the information processing apparatus 100. Further, some or all of the above-mentioned hardware configurations may be located in a network.

It should be noted that the present technology may also take the following configurations.

(1) An information processing apparatus, including:
a determination unit that obtains a position of a virtual object relative to a display region and determines whether or not a correction allowable region set in a region different from the virtual object overlaps at least a part of the display region when the virtual object is located outside the display region; and
a display control unit that causes at least a part of a display object showing the virtual object in the display region to be displayed in a case where the determination unit determines that the correction allowable region overlaps at least the part of the display region.

(2) The information processing apparatus according to (1), in which
the display control unit causes the virtual object to move to a contact position that is a position at which the correction allowable region is in contact with the display region, and sets at least a part of the virtual object as the display object.

(3) The information processing apparatus according to (2), further including
an acoustic processing unit that localizes a virtual sound source at the virtual object, in which
the acoustic processing unit moves, when the display control unit causes the virtual object to move to the contact position, the virtual sound source in accordance with the movement of the virtual object.

(4) The information processing apparatus according to (1), in which
the display control unit sets a copy image of the virtual object as the display object and causes the copy image to be displayed at a position in the display region, the position being closest to the virtual object.

(5) The information processing apparatus according to (4), in which the display control unit causes the copy image to move to be superimposed on the virtual object when the virtual object moves into the display region.

(6) The information processing apparatus according to (1), in which
the display control unit generates an enlarged image of the virtual object, which is centered at the virtual object, and sets a portion of the enlarged image, which is included in the display region, as the display object.

(7) The information processing apparatus according to (6), in which
the display control unit causes the enlarged image to contract toward the virtual object when the virtual object moves into the display region.

(8) The information processing apparatus according to (1), in which
the display control unit generates an icon indicating a direction of the virtual object as the display object.

(9) The information processing apparatus according to any one of (1) to (8), further including
The information processing apparatus according to claim 1,
an acoustic processing unit that localizes a virtual sound source at the virtual object, in which
the determination unit determines whether or not the correction allowable region and the display region overlap each other when the virtual object is not located within the display region after a predetermined period of time elapses after sound is generated from the virtual sound source.

(10) The information processing apparatus according to any one of (1) to (8), further including
an acoustic processing unit that localizes a virtual sound source at the virtual object, in which
the determination unit determines whether or not the correction allowable region and the display region overlap each other when moving velocity of the display region relative to the virtual object is equal to or lower than a predetermined value after sound is generated from the virtual sound source.

(11) A program that causes an information processing apparatus as:
a determination unit that obtains a position of a virtual object relative to a display region of a display device and determines whether or not a correction allowable region set in a region different from the virtual object overlaps at least a part of the display region when the virtual object is located outside the display region; and
a display control unit that causes at least a part of a display object showing the virtual object in the display region to be displayed in a case where the determination unit determines that the correction allowable region overlaps at least the part of the display region.

(12) An information processing method, including:
obtaining, by a determination unit, a position of a virtual object relative to a display region of a display device and determines whether or not a correction allowable region set in a region different from the virtual object overlaps at least a part of the display region when the virtual object is located outside the display region; and
causing, by a display control unit, at least a part of a display object showing the virtual object in the display region to be displayed in a case where the determination unit determines that the correction allowable region overlaps at least the part of the display region.

REFERENCE SIGNS LIST 100 information processing apparatus
101 display 102 speaker
103 sensor
111 direction detection processing unit
112 display control unit
113 display unit
114 acoustic processing unit
115 sound output unit
116 determination unit

The invention claimed is:

1. An information processing apparatus, comprising:
a determination unit configured to:
obtain a first position of a virtual object relative to a display region of a display;
set a correction allowable region in a region, of the display, different from the first position of the virtual object; and
determine whether the correction allowable region overlaps at least a part of the display region when the first position of the virtual object is outside the display region; and
a display control unit configured to:
cause at least a part of a display object, showing the virtual object, in the display region to be displayed based on the determination that the set correction allowable region overlaps at least the part of the display region;
generate an enlarged image of the virtual object, which is centered at the virtual object; and
set a portion of the enlarged image, which is included in the display region, as the display object.

2. The information processing apparatus according to claim 1, wherein
the display control unit is further configured to:
cause the virtual object to move to a contact position that is a second position at which the correction allowable region is in contact with the display region, and
set at least a part of the virtual object as the display object.

3. The information processing apparatus according to claim 2, further comprising:
an acoustic processing unit configured to localize a virtual sound source at the virtual object, wherein
the acoustic processing unit is further configured to move, based on the movement of the virtual object to the contact position, the virtual sound source in accordance with the movement of the virtual object.

4. The information processing apparatus according to claim 1, wherein
the display control unit is further configured to:
set a copy image of the virtual object as the display object, and
cause the copy image to be displayed at a second position in the display region,
the second position is at a first part of the display region, and
the first part is closest to the virtual object than remaining part of the display region.

5. The information processing apparatus according to claim 4, wherein
the display control unit is further configured to cause the copy image to move to be superimposed on the virtual object when the virtual object moves into the display region.

6. The information processing apparatus according to claim 1, wherein
the display control unit is further configured to cause the enlarged image to contract toward the virtual object when the virtual object moves into the display region.

7. The information processing apparatus according to claim 1, wherein
the display control unit is further configured to generate an icon indicating a direction of the virtual object as the display object.

8. The information processing apparatus according to claim 1, further comprising:
an acoustic processing unit configured to localize a virtual sound source at the virtual object, wherein
the determination unit is further configured to determine whether the correction allowable region and the display region overlap each other when the virtual object is not within the display region after a specific period of time elapses after sound is generated from the virtual sound source.

9. The information processing apparatus according to claim 1, further comprising:
an acoustic processing unit configured to localize a virtual sound source at the virtual object, wherein
the determination unit is further configured to determine whether the correction allowable region and the display region overlap each other when a moving velocity of the display region relative to the virtual object is equal to or lower than a specific value after sound is generated from the virtual sound source.

10. A non-transitory computer-readable medium having stored thereon, computer executable-instructions that, when executed by a processor of an information processing apparatus, cause the processor to execute operations, the operations comprising:
obtaining a position of a virtual object relative to a display region of a display device;
setting a correction allowable region in a region, of the display device, different from the position of the virtual object;
determining whether the correction allowable region overlaps at least a part of the display region when the position of the virtual object is outside the display region;
causing at least a part of a display object, showing the virtual object, in the display region to be displayed based on the determination that the set correction allowable region overlaps at least the part of the display region;
generating an enlarged image of the virtual object, which is centered at the virtual object; and
setting a portion of the enlarged image, which is included in the display region, as the display object.

11. An information processing method, comprising:
in an information processing apparatus that includes, a determination unit and a display control unit:
obtaining, by the determination unit, a position of a virtual object relative to a display region of a display;
setting, by the determination unit, a correction allowable region in a region, of the display, different from the position of the virtual object;
determining, by the determination unit, whether the correction allowable region overlaps at least a part of the display region when the position of virtual object is outside the display region;
causing, by the display control unit, at least a part of a display object, showing the virtual object, in the display region to be displayed based on the determination that the set correction allowable region overlaps at least the part of the display region;

generating, by the display control unit, an enlarged image of the virtual object, which is centered at the virtual object; and setting, by the display control unit, a portion of the enlarged image, which is included in the display region, as the display object.

12. An information processing apparatus, comprising:

an acoustic processing unit configured to localize a virtual sound source at virtual object;

a determination unit configured to:
  obtain a first position of the virtual object relative to a display region of a display;
  set a correction allowable region in a region, of the display, different from the first position of the virtual object; and
  determine whether the correction allowable region and the display region overlap each other when a moving velocity of the display region relative to the virtual object is equal to or lower than a specific value after sound is generated from the virtual sound source; and a display control unit configured to:
  cause at least a part of a display object, showing the virtual object, in the display region to be displayed based on the determination that the set correction allowable region overlaps at least the part of the display region.

* * * * *